(12) United States Patent
Burgess

(10) Patent No.: US 7,104,022 B2
(45) Date of Patent: Sep. 12, 2006

(54) DECK MOUNTING BRACKET

(75) Inventor: Andrew Paul Burgess, Fall Creek, WI (US)

(73) Assignee: Menard, Inc., Eau Claire, WI (US)

( * ) Notice: Subject to any disclaimer, the term of this patent is extended or adjusted under 35 U.S.C. 154(b) by 0 days.

(21) Appl. No.: 10/712,121

(22) Filed: Nov. 13, 2003

(65) Prior Publication Data

US 2004/0094678 A1    May 20, 2004

(51) Int. Cl.
*E04B 1/38* (2006.01)
*E04C 5/00* (2006.01)

(52) U.S. Cl. .................. 52/702; 248/220.21; 248/300

(58) Field of Classification Search ............. 248/220.1, 248/220.21, 226.11, 300; 52/712, 702, 715, 52/714
See application file for complete search history.

(56) References Cited

U.S. PATENT DOCUMENTS

| 844,459 | A | * | 2/1907 | McCausland ................. 293/1 |
| 1,562,784 | A | * | 11/1925 | Olsen ........................ 52/714 |
| 1,920,520 | A | * | 8/1933 | Nord ........................ 248/48.2 |
| 2,990,590 | A | * | 7/1961 | Graveley .................... 403/189 |
| 3,359,701 | A | | 12/1967 | Schneller |
| 4,083,458 | A | * | 4/1978 | Young, Jr. ................... 211/187 |
| 4,260,277 | A | * | 4/1981 | Daniels ...................... 403/235 |
| 4,359,851 | A | * | 11/1982 | Daniels ........................ 52/298 |
| 4,527,375 | A | * | 7/1985 | Braginetz ..................... 52/712 |
| 4,641,474 | A | * | 2/1987 | Cannarsa ..................... 52/514 |
| 4,727,815 | A | * | 3/1988 | Miller ........................ 108/42 |
| 4,964,253 | A | * | 10/1990 | Loeffler ...................... 52/289 |
| 4,965,980 | A | * | 10/1990 | Leavens ...................... 52/712 |
| 4,995,209 | A | * | 2/1991 | Cobb ........................ 52/238.1 |
| 5,160,211 | A | | 11/1992 | Gilb |
| 5,170,977 | A | * | 12/1992 | McMillan ................... 248/300 |
| 5,497,593 | A | * | 3/1996 | Riesberg ...................... 52/702 |
| 5,775,048 | A | | 7/1998 | Orchard |
| 6,015,123 | A | * | 1/2000 | Perez et al. .............. 248/220.1 |
| 6,698,971 | B1 | * | 3/2004 | Wilhelmi .................... 403/403 |

* cited by examiner

*Primary Examiner*—Amy J. Sterling
(74) *Attorney, Agent, or Firm*—Merchant & Gould, PC

(57) ABSTRACT

The present invention is a mounting bracket for the construction of a deck. The mounting bracket has a separating flange, a joist-fastening portion, a support flange, and a plank-fastening flange. The separating flange and the plank-fastening flange are generally located in a first plane. The joist-fastening portion is generally located perpendicular to the first plane. The joist-fastening portion has a joist-fastening hole for securing the mounting bracket to a vertical joist. The support flange includes an access hole to provide access through the support flange to allow an installer to install a first fastener in the joist-fastening hole. The plank-fastening flange includes a plank-fastening hole for securing the mounting bracket to a horizontal plank.

15 Claims, 2 Drawing Sheets

DECK MOUNTING BRACKET

FIELD OF THE INVENTION

The present invention relates to a mounting bracket for use in the construction of a deck. Specifically, the present invention provides a mounting bracket for mounting planks and joists to form a deck structure.

BACKGROUND OF THE INVENTION

Deck structures typically included a plurality of planks mounted on a plurality of joists to form a deck surface. A plurality of wooden planks were typically arranged in a parallel configuration and nailed directly to a frame of horizontally-spaced wooden joists. However, nailing through the top surface of the planks which form deck surface allowed moisture run-off to infiltrate the planks and joists thereby causing the planks and joists to decay. Moreover, nailing through the deck surface decreased the aesthetic appearance of the deck surface and created a safety hazard as the area surrounding the nail splintered and cracked. Further, the appearance and structural integrity of the deck was often further degraded due to errant hammer strikes impacting the deck surface.

In an attempt to improve deck structures, mounting brackets and fastening clips were used to secure the planks to the joists rather than nailing them together directly. Mounting brackets and fastening clips allowed the planks to be secured to the joists without nailing through the deck surface, thereby improving the appearance and safety of the deck structure. However, the prior art mounting brackets and fastening clips did not provide an optimal configuration for fastening the planks to the joists. For example, some of the prior art mounting brackets and fastening clips created holes in the upper surface of the joists allowing moisture run-off to infiltrate the joists thereby causing the joists to decay. Further, prior art mounting brackets and fastening clips required one or more of the nails or screws used to secure the mounting bracket or fastening clip to the planks or joists to enter the planks or joists at an angle other than ninety degrees which was difficult to fasten.

SUMMARY OF THE INVENTION

The present invention provides a mounting bracket for the construction of a deck typically comprising a plurality of horizontal planks affixed to a plurality of vertical, horizontally-spaced joists. The mounting bracket is used to secure the planks, which can create a deck surface, to the joists. The mounting bracket is affixed to the side surface of a joist using a first fastener. The mounting bracket is also affixed to the bottom surface of a plank using a second fastener.

It is an advantage of the present invention to provide a mounting bracket for the construction of a deck that does not impair the appearance or safety of the deck surface.

It is another advantage of the present invention to secure the mounting bracket to the bottom surface of the planks to avoid drilling holes through the top of the planks.

It is a further advantage of the present invention to secure the mounting bracket to the side surface of the joists thereby restricting moisture run-off from entering the joist and causing decay.

Moreover, it is another advantage of the present invention to provide a mounting bracket wherein all the screws and nails enter the planks and joists substantially perpendicular to the plank and joist surfaces.

Additional features and advantages of the present invention are described in. and will be apparent from, the detailed description of the presently preferred embodiments and from the drawings.

DETAILED DESCRIPTION OF THE PREFERRED EMBODIMENTS

Figure 1:
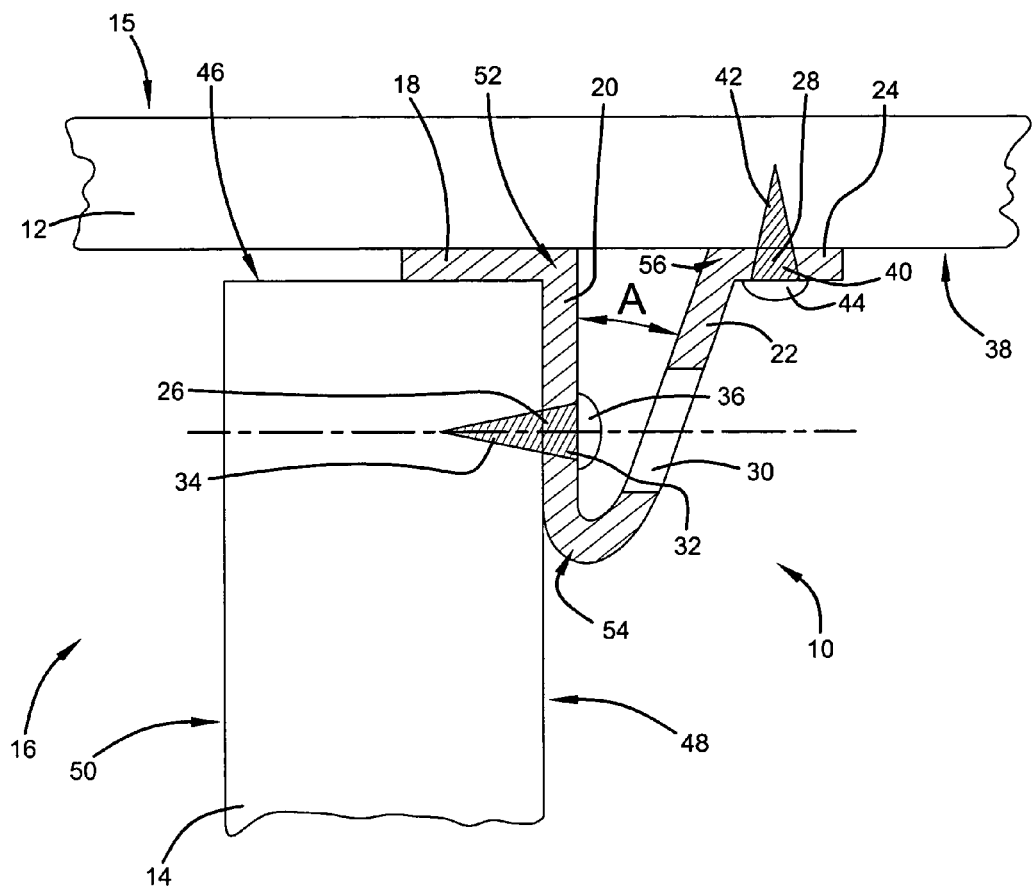
FIG. 1 is a side view of the mounting bracket of the present invention shown secured to both a plank and a joist.

FIG. 1 illustrates one embodiment of a mounting bracket 10 of the present invention. As shown in FIG. 1, the mounting bracket 10 is used to secure a plank 12 to a joist 14 to form a deck surface 15 as part of a deck construction 16. The typical deck construction 16 includes a plurality of parallel-aligned, horizontal wooden planks 12 secured to a plurality of parallel-aligned, vertical wooden joists 14. However, a deck construction 16 may consist of any number of planks 12 and joists 14 constructed from any material as would be apparent to one skilled in the art. For example, the planks 12 and the joists 14 may be constructed from a plastic or a plastic composite. At a minimum, the mounting bracket 10 is used to couple a single plank 12 to a single joist 14. Consequently, the mounting bracket 10 is primarily described herein with respect to a single plank 12 and a single joist 14. However, it is contemplated that the mounting bracket 10 will most commonly be used to secure a plurality of planks 12 to a joist 14. Further, it is contemplated that a plurality of mounting brackets 10 may be used with a joist 14 to secure a plurality of planks 12 thereto.

Figure 2:
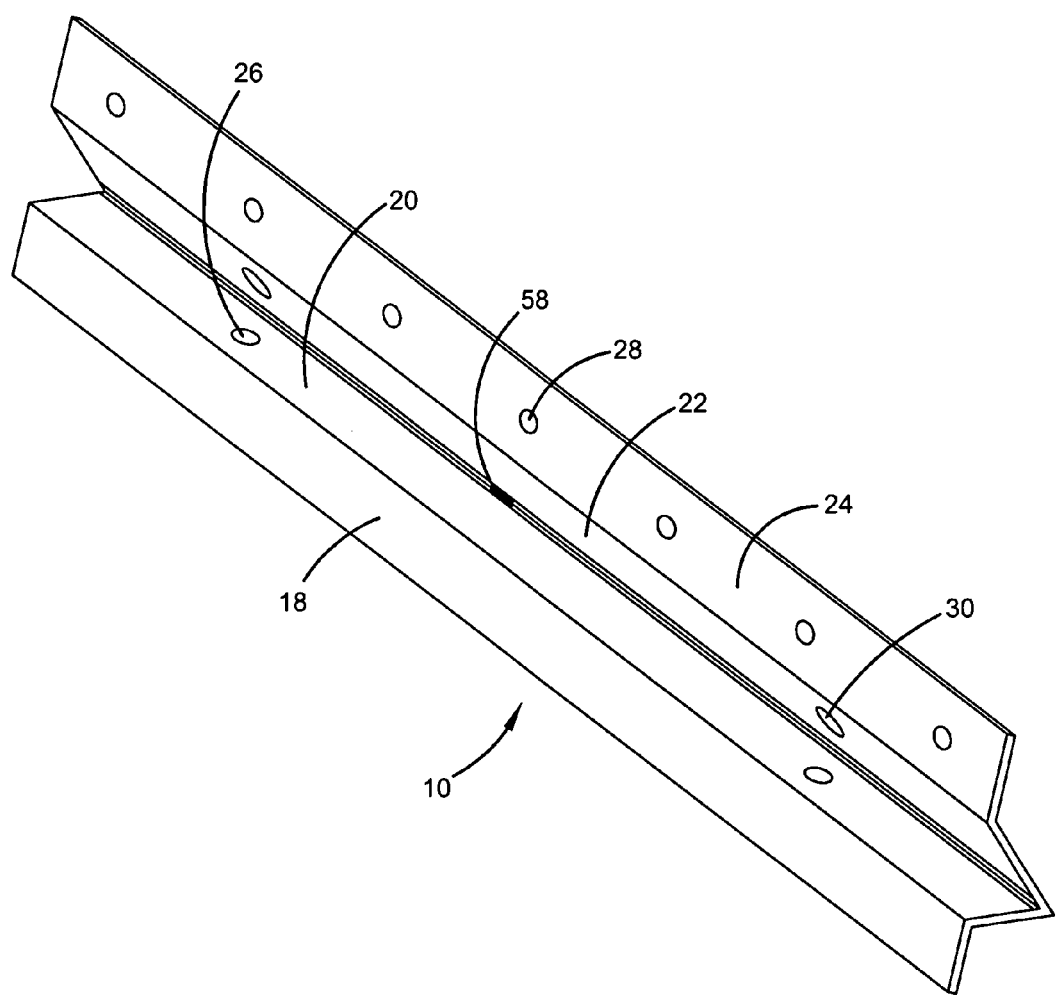
FIG. 2 is a perspective view of the mounting bracket of the present invention.

Referring now to FIG. 2 the mounting bracket 10 has a separating flange 18. a joist-fastening portion 20, a support flange 22, and a plank fastening flange 24 formed from a continuous piece of structural material. The mounting bracket 10 may be formed of steel, aluminum, plastic, or any other structural material. The mounting bracket 10 is thick enough to provide structural stability to the deck construction 16; however, the thickness of the mounting bracket 10 is limited to promote ease of installation by an installer. In the embodiment of the present invention shown in FIG. 2, the mounting bracket 10 is formed from a single piece of galvanized steel. However, the mounting bracket 10 can be formed from other materials such as, for example, aluminum or stainless steel. The mounting bracket 10 can be formed in various lengths suitable for constructing decks of varying sizes.

In some applications it may be desirable to secure the mounting bracket 10 to a first side surface 48 of the joist 14 and a second mounting bracket 10 to a second, opposite side surface 50 of the joist 14. In this dual mounting bracket 10 configuration, the separating flange 18 of each mounting bracket 10 should not exceed half the width of the joist 14 in order to prevent overlap or interference between the mounting brackets 10. When used with typical joists 14, commonly one and one-half inches in width, the separating flange 18 should not exceed three-fourths of an inch in length.

As also shown in FIG. 2, the mounting bracket 10 includes at least one joist-fastening hole 26 located in the joist-fastening portion 20 of the mounting bracket 10. Similarly, the mounting bracket 10 includes at least one plank-fastening hole 28 located in the plank-fastening flange 24 of the mounting bracket 10. Further, the support flange 22 of the mounting bracket 10 additionally includes one or more access holes 30 aligned with each joist-fastening hole 26 to provide access through the support flange 22 to each joist-fastening hole 26 as further described below with reference to FIG. 1.

The length of the mounting bracket 10 is adapted to secure a predetermined number of planks 12 to a joist 14. Accordingly, the mounting bracket 10 includes at least one plank-fastening hole 28 for each plank 12 to be fastened to the joist 14. Similarly, the number of joist-fastening holes 26 provided in the joist-fastening portion 20 of the mounting bracket 10 depends upon the length of the mounting bracket 10; the longer the mounting bracket 10, the greater the number of joist-fastening holes 26.

Referring now to FIG. 1, the separating flange 18 transitions into the joist-fastening portion 20 at an intersecting end portion 52. The joist-fastening portion 20 is disposed approximately perpendicular to the separating flange 18 such that the separating flange 18 may abut an upper surface 46 of the joist 14 while the joist-fastening portion 20 may abut the first side surface 48 of the joist 14.

As further shown in FIG. 1, the joist-fastening portion 20 transitions into the support flange 22 at a lower end 54 of the mounting bracket 10. The lower end 54 of the mounting bracket 10 may be curved or angled to dispose the support flange 22 of the mounting bracket 10 a horizontal distance away from the joist-fastening portion 20. In the embodiment illustrated in FIG. 1, the lower end 54 of the mounting bracket 10 is curved and the support flange 22 of the mounting bracket 10 extends away from the joist-fastening portion 20 at an angle A. Although it is contemplated that the support flange 22 may extend away from the joist-fastening portion 20 at other angles, an angle of approximately 30 to 40 degrees, preferably approximately 35 degrees, may be used to increase the load bearing strength of the plank-fastening flange 24 in comparison to angles of greater than approximately 35 degrees. Additionally, one or more weep holes 58 may be incorporated into the lower end 54 of the mounting bracket 10 to provide drainage for water that may accumulate along the lower end 54.

Also shown in FIG. 1, the support flange 22 of the mounting bracket 10 transitions into the plank-fastening flange 24 at a spacer portion 56 of the mounting bracket 10. The plank-fastening flange 24 is approximately on the same plane as the separating flange 18 such that a bottom surface 38 of the plank 12 abuts both the separating flange 18 and the plank-fastening flange 24.

As shown in FIG. 1, the mounting bracket 10 is secured to the joist 14 using a first fastener 32. As shown in FIG. 1, the first fastener 32 may be a screw. Alternatively, the first fastener 32 may be a nail, bolt, or other fastening means. The first fastener 32 typically includes an elongated fastening portion 34 and a flange portion 36. Consequently, the mounting bracket 10 typically attaches to the joist 14 by passing the elongated fastening portion 34 through the joist-fastening hole 26 such that the joist-fastening portion 20 of the mounting bracket 10 is secured between the mounting bracket 10 and the flange portion 36 of the first fastener 32, as shown in FIG. 1. A first washer (not shown) or other device may be inserted between the mounting bracket 10 and the flange portion 36 to further secure the mounting bracket 10 to the joist 14.

The access hole 30 is provided to allow an installer to install the first fastener 32 in the joist-fastening hole 26. In the embodiment shown in FIG. 2, there is a corresponding access hole 30 for each joist-fastening hole 26. Alternatively, it is contemplated that an access hole 30 may provide access to a plurality of joist-fastening holes 26. The size and shape of the access hole 30 may correspond to the fastening means to be used as the first fastener 32. For example, the access hole 30 may be sized to accommodate a screw driver or a hammer when the first fastener 32 is a screw or nail, respectively.

As shown in FIG. 1, the mounting bracket 10 is secured to the first side surface 48 of the joist 14. By securing the mounting bracket 10 to the first side surface 48 of the joist 14, moisture run-off from the deck construction 16 is restricted from entering the joist 14 and causing decay therein. Accordingly, as shown in FIG. 1, it may be desirable to employ a first fastener 32 that passes through the first side surface 48 of the joist 14, but does not pass though or damage the second, opposite side surface 50 of the joist 14 in order to further restrict moisture run-off from entering the joist 14.

As further shown in FIG. 1, the mounting bracket 10 is secured to the bottom surface 38 of the plank 12 using a second fastener 40. The second fastener 40 may be a screw, as shown in FIG. 1. Alternatively, the second fastener 40 may be a nail, bolt, or other fastening means for securing the mounting bracket 10 to the bottom surface 38 of the plank 12. It is important to note that the second fastener 40 secures the mounting bracket 10 to the plank 12, but does not pass through the upper deck surface 15. The second fastener 40 typically includes an elongated fastening portion 42 and a flange portion 44. Consequently, the mounting bracket 10 typically attaches to the bottom surface 38 of the plank 12 by passing the elongated fastening portion 42 through the plank-fastening hole 28 such that the plank-fastening flange 24 of the mounting bracket 10 is secured between the bottom surface 38 of the plank 12 and the flange portion 44 of the second fastener 40, as shown in FIG. 1. A second washer (not shown) or other device may be inserted between the mounting bracket 10 and the flange portion 44 of the second fastener 40 to increase the security of the mounting bracket 10 to the plank.12.

By securing the mounting bracket 10 to the bottom surface 38 of the plank 12. moisture run-off is restricted from entering the plank 12 and causing decay therein. Additionally, the appearance and safety of the deck construction 16 is improved because the hardware associated with the mounting bracket 10 and the second fastener 40 is concealed beneath the plank 12.

As shown in FIG. 1, when the mounting bracket 10 is properly assembled to secure the plank 12 to the joist 14, the bottom surface 38 of the plank 12 is positioned above the upper surface 46 of the joist 14. The distance between the bottom surface 38 of the plank 12 and the upper surface 46 of the joist 14 is equal to the thickness of the separating flange 18 of the mounting bracket 10. The spacing between the plank 12 and the joist 14 increases air circulation between the bottom surface 38 of the plank 12 and the upper surface 46 of the joist 14 to help prevent the growth of mold and to help prevent the plank 12 and joist 14 from decay due to rotting.

It should be noted that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A mounting bracket for securing a plank to a joist, said mounting bracket comprising: a continuous piece of structural material of a predetermined length wherein the cross-section of said mounting bracket is curved or angled, said mounting bracket further comprising:
   a planar, solid separating flange portion;
   a joist-fastening flange portion connected to said separating flange portion, which is approximately perpendicular to said separating flange portion, said joist-fastening flange portion having a hole therein for receiving a fastener for fastening said mounting bracket to the joist;
   a support flange portion connected to said joist-fastening flange portion, said support flange portion having an access hole therein wherein said access hole is aligned with said joist fastening hole; and
   a planar plank-fastening flange portion connected to said support flange portion, said planar plank-fastening flange portion consisting of a free edge on a side opposite said support flange portion and further having a hole therein for receiving a fastener for fastening said mounting bracket to the plank and wherein said separating flange portion, said joist fastening flange portion, said support flange portion and said plank-fastening flange portion transition uninterrupted one into another to form said mounting bracket.

2. The mounting bracket of claim 1, wherein said joist-fastening flange portion extends from said separating flange portion at an angle of approximately 90°.

3. The mounting bracket of claim 1 wherein said separating flange portion and said plank-fastening flange portion are substantially co-planar.

4. The mounting bracket of claim 1 wherein said support flange portion extends from said joist-fastening flange portion at an angle of approximately 35 degrees.

5. A mounting bracket assembly for mounting a plank to a joist comprising:
   a planar, solid separating flange portion for placement between the plank and the joist; a joist-securing flange portion adjacent said separating flange portion, wherein said joist-securing flange portion is capable of being secured to the joist; a support flange portion adjacent said joist-securing flange portion, said support flange portion having an access hole therein wherein said access hole is aligned with a joist fastening hole; and, a planar plank-securing flange portion supported by said support flange portion, said planar plank-securing flange portion consisting of a free edge on a side opposite said support flange portion wherein said plank-securing flange portion is capable of being secured to the plank.

6. The assembly of claim 5 further comprising a fastener for securing said joist-securing flange portion to said joist.

7. The assembly of claim 6 wherein said securing means is selected from the group consisting of a screw, a nail or a bolt.

8. The assembly of claim 5 further comprising a fastener for securing said plank-securing flange portion to said plank.

9. The assembly of claim 8 wherein said securing means is selected from the group consisting of a screw, a nail or a bolt.

10. The assembly of claim 5 further comprising a spacer portion between said plank-securing flange portion and said support flange portion.

11. The assembly of claim 10 wherein said spacer portion is curved.

12. The mounting bracket of claim 1, wherein one or more weep holes are provided.

13. The mounting bracket of claim 1, wherein said mounting bracket is affixed to the side surface of said joist and the bottom surface of said plank.

14. The mounting bracket of claim 1 wherein said structural material is selected from the group consisting of steel, aluminum, and plastic.

15. The mounting bracket of claim 12 wherein the mounting bracket assembly has a lower end, and one or more weep holes are incorporated into the lower end of said mounting bracket assembly.

* * * * *

UNITED STATES PATENT AND TRADEMARK OFFICE
CERTIFICATE OF CORRECTION

| | | |
|---|---|---|
| PATENT NO. | : 7,104,022 B2 | Page 1 of 1 |
| APPLICATION NO. | : 10/712121 | |
| DATED | : September 12, 2006 | |
| INVENTOR(S) | : Burgess | |

It is certified that error appears in the above-identified patent and that said Letters Patent is hereby corrected as shown below:

Title page, Item (63) Related Application Data: Insert --Continuation of application No. 10/154244 filed on May 23, 2002, now abandoned.--

Signed and Sealed this

Twenty-seventh Day of November, 2007

JON W. DUDAS
*Director of the United States Patent and Trademark Office*